US012629879B2

(12) United States Patent
Unruh et al.

(10) Patent No.: US 12,629,879 B2
(45) Date of Patent: May 19, 2026

(54) METHOD FOR EXTRUDING AN EXTRUSION PRODUCT AND EXTRUSION LINE

(71) Applicant: CiTEX Holding GmbH, Melle (DE)

(72) Inventors: Andrej Unruh, Bird in Hand, PA (US); Jan H. Petermann, Melle (DE)

(73) Assignee: CiTEX Holding GmbH, Melle (DE)

( * ) Notice: Subject to any disclaimer, the term of this patent is extended or adjusted under 35 U.S.C. 154(b) by 25 days.

(21) Appl. No.: 18/303,187

(22) Filed: Apr. 19, 2023

(65) Prior Publication Data

US 2023/0339164 A1 Oct. 26, 2023

Related U.S. Application Data

(60) Provisional application No. 63/332,874, filed on Apr. 20, 2022.

(51) Int. Cl.
| | |
|---|---|
| *B29C 48/92* | (2019.01) |
| *B29C 48/00* | (2019.01) |
| *B29K 507/04* | (2006.01) |

(52) U.S. Cl.
CPC ............ *B29C 48/92* (2019.02); *B29C 48/022* (2019.02); *B29C 2948/92152* (2019.02); *B29C 2948/92247* (2019.02); *B29C 2948/92447* (2019.02); *B29C 2948/92723* (2019.02); *B29C 2948/92828* (2019.02); *B29K 2507/04* (2013.01)

(58) Field of Classification Search
CPC ...................................................... B29C 48/00
See application file for complete search history.

(56) References Cited

U.S. PATENT DOCUMENTS

| | | | | |
|---|---|---|---|---|
| 3,396,219 | A | * | 8/1968 | Amberg, Jr. ............. G05D 5/03 |
| | | | | 264/40.7 |
| 5,122,580 | A | * | 6/1992 | Zarian ................... B29C 35/007 |
| | | | | 526/323.1 |
| 5,711,904 | A | * | 1/1998 | Eswaran ................. B29C 48/39 |
| | | | | 264/40.7 |
| 2016/0236409 | A1 | * | 8/2016 | Armani ................. B29C 64/106 |

(Continued)

FOREIGN PATENT DOCUMENTS

| | | | | |
|---|---|---|---|---|
| DE | 19634556 A1 | * | 3/1998 | ......... B29C 47/0014 |
| DE | 102015110600 B3 | | 12/2016 | |

(Continued)

OTHER PUBLICATIONS

DE 102019109339 A1 EPO english translation (Year: 2020).*

(Continued)

*Primary Examiner* — Susan D Leong
(74) *Attorney, Agent, or Firm* — Barnes & Thornburg LLP

(57) ABSTRACT

The present disclosure relates to a method and an extrusion line in which an additive content, in particular, a carbon black content, can be determined inline during extrusion of an extrusion product. For this purpose, an initial measurement is carried out in which a layer thickness and a refractive index of the extrusion product are determined, whereupon a continuous in-line measurement of the current additive content is carried out by a stationary radar measuring device. Thus, the layer thickness is set and the additive content is determined directly by the radar measuring device and controlled by setting the additive feed rate, in particular as a close-loop control.

11 Claims, 3 Drawing Sheets

(56)         References Cited

U.S. PATENT DOCUMENTS

| 2018/0319986 A1* | 11/2018 | Lavallée | C08L 101/04 |
| 2020/0238641 A1* | 7/2020 | Liao | B29C 48/625 |
| 2021/0370574 A1* | 12/2021 | Sikora | B29C 48/92 |
| 2022/0412723 A1* | 12/2022 | Strey | B29C 48/10 |

FOREIGN PATENT DOCUMENTS

| DE | 102017129232 A1 | | 6/2019 | |
| DE | 202018006144 U1 | | 6/2019 | |
| DE | 102018124175 A1 | | 4/2020 | |
| DE | 102019109339 A1 | * | 10/2020 | G01B 11/026 |
| DE | 102020116810 A1 | | 12/2021 | |
| EP | 3156140 A1 | | 4/2017 | |
| WO | 2016087564 A1 | | 6/2016 | |
| WO | 2017000933 A1 | | 1/2017 | |

OTHER PUBLICATIONS

DE-19634556-A1 english translation (Year: 1998).*
European Search Report for European Patent App. No. 23168396
dated Sep. 13, 2023, 2 pages.

* cited by examiner

METHOD FOR EXTRUDING AN EXTRUSION PRODUCT AND EXTRUSION LINE

PRIORITY CLAIM

This application claims priority under 35 U.S.C. § 119(e) to U.S. Provisional Application Ser. No. 63/332,874, filed Apr. 20, 2022, which is expressly incorporated by reference herein.

BACKGROUND

The present disclosure relates to a method and an extrusion line for extruding an extrusion product.

SUMMARY

According to the present disclosure, a method and an extrusion line in which an additive content, in particular, a carbon black content, can be determined inline during extrusion of an extrusion product.

In illustrative embodiments, an initial measurement is carried out in which a layer thickness and a refractive index of the extrusion product are determined, whereupon a continuous in-line measurement of the current additive content is carried out by a stationary radar measuring device.

In illustrative embodiments, the layer thickness is set and the additive content is determined directly by the radar measuring device and controlled by setting the additive feed rate, in particular as a close-loop control.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 1:
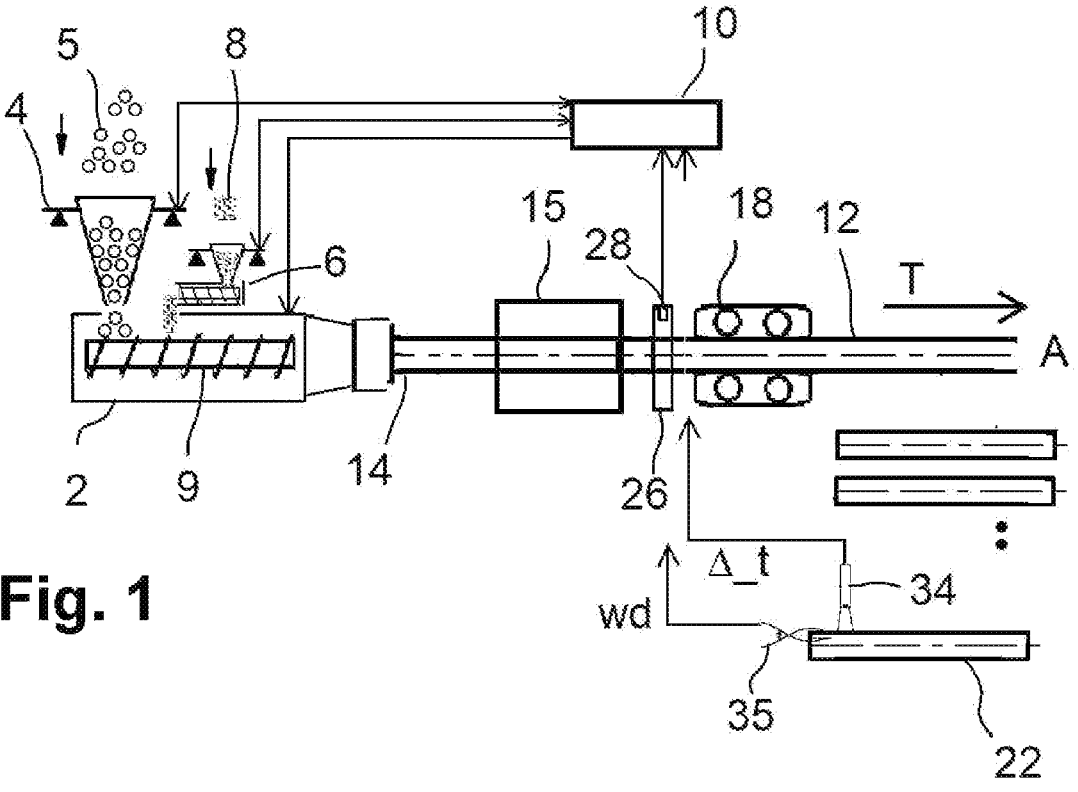
Figure 2:
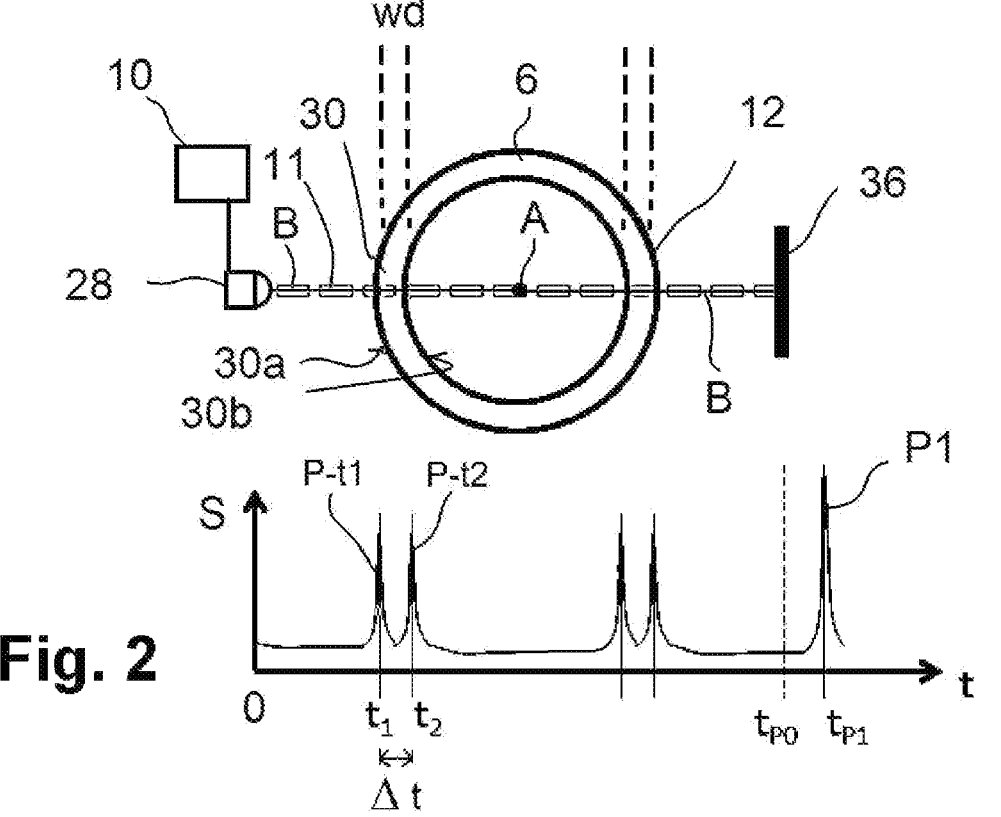
Figure 3:
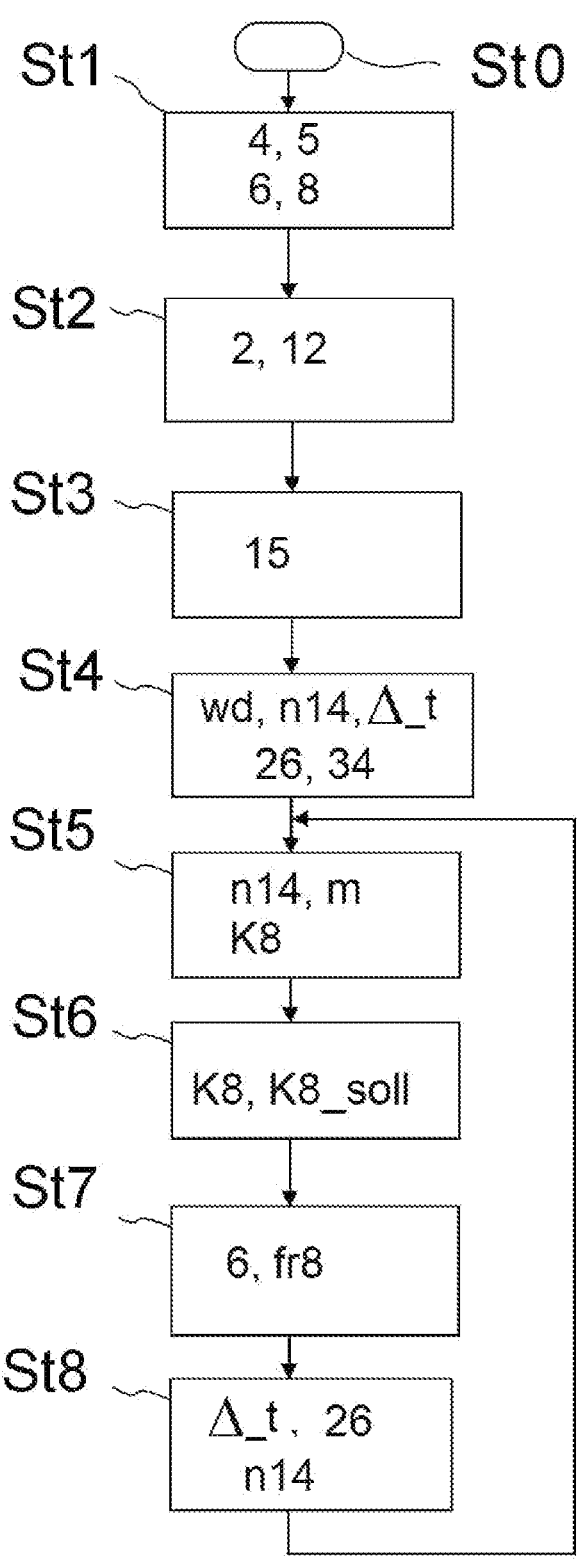

The detailed description particularly refers to the accompanying figures in which:

FIG. 1 a device for determining an additive content according to one embodiment of the present disclosure;

FIG. 2 an illustration of radar measurement of a pipe;

FIG. 3 a flow diagram of a method according to the present disclosure; and

Figure 4:
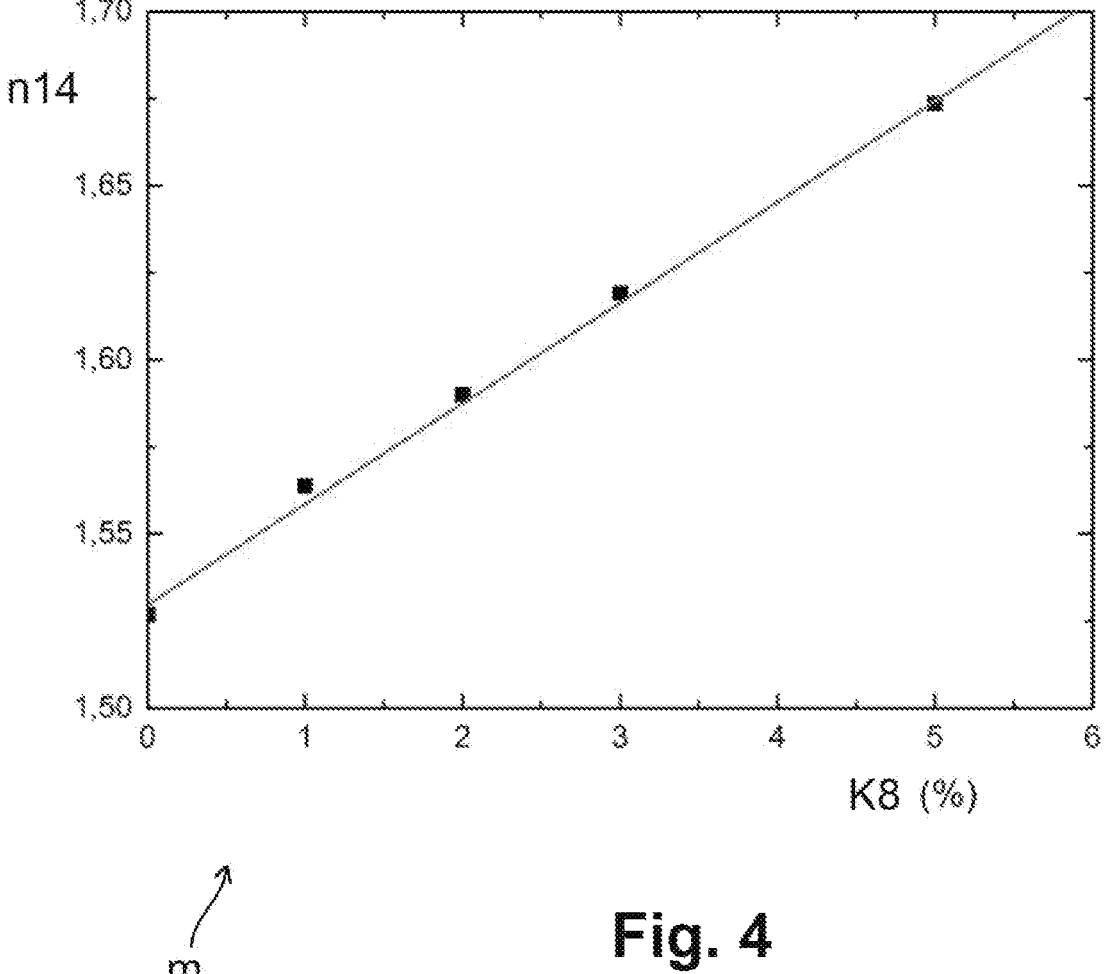

FIG. 4 a measurement curve of stored values of the refractive index of a polyethylene plastic as a function of the carbon black content.

DETAILED DESCRIPTION

An extrusion line 1 comprises an extruder 2 to which, in a first step St1, a first bulk material, in this case a plastic bulk material 5 such as, for example, polyethylene pellets or polyethylene granules, is fed via a gravimetric feeding device 4. Thus, the gravimetric feeding device 4 continuously feeds the bulk material 5 into the extruder 2, measures a mass throughput, and outputs a first feed rate fr5 to a control device 10, wherein the first feed rate fr5 represents the mass throughput, in particular as mass per time, e.g. kg/s. Furthermore, a gravimetric metering device 6 is provided, which takes up pellets or powder 8 as additive bulk material, measures the mass throughput as additive feed rate fr8 and outputs it to the control device 10.

Different to the embodiment shown schematically in FIG. 1, the bulk material 5 and the additive pellets or powder 8 can be fed into the extruder 2 via a common hopper. In both embodiments, they are mixed by the extruder 2 via the extruder screw 9 and conveyed according to step St2, being melted in any suitable manner by the extruder 2 and subsequently discharged continuously as a pipe 12 in the production direction T along an extrusion axis A.

The extruded pipe 12 is thus formed from a mixed plastic material 14, which is initially still molten and is, in step St3, subsequently cooled in a cooling device 15. For this purpose, the pipe 12 is conveyed from a pull-off or haul-off 18 through the cooling device 15 and subsequently to a cutting device 20, in which pipe sections 22 are cut to length or cut off.

After cooling in step St4, the tube 12 is measured both for its layer thickness, i.e. in this case the wall thickness wd of its wall 30, and the refractive index n14, for which purpose two measurements are performed, at least one of which is a radar or THz measurement.

For this purpose, according to a first embodiment, a stationary (inline) THz measuring device 26 or a portable THz sensor 34 is used to determine a transit time Delta_t by emitting THz radiation 11 according to FIG. 2 and passing through the wall 30 of the tube 2, with reflection peaks P-t1 being measured at a front interface 30a and P-t2 at a rear interface 30b. This time-of-flight measurement thus yields a time-of-flight Delta_t, which is calculated from the wall thickness wd and the speed of light C14 of the cooled plastic material 14, with C0 as the speed of light in a vacuum or air, as $$C0/C14=n14, \text{ and}$$

$$2*wd=C14*Delta\_t=C0/n14*Delta\_t,$$

$$\text{which results in } 2*wd*n14=C0*Delta\_t \tag{GL1}$$

Since Delta_t is measured, only the product wd*n14 is known at first. A second measurement makes it possible to determine both values.

According to one embodiment, a calibration measurement of the empty measuring chamber 32 can be made before extrusion, in which, according to FIG. 2, the THz measuring device 26 outputs the THz radiation 11 through the empty measuring chamber 32 via a THZ sensor 28 and determines the transit time from a reflection device 36 and back, or instead of the reflection device 36, the radiation that has passed through the measuring chamber 32 is measured directly, whereby the setting of the THz measuring device 26 is not changed between the calibration measurement and subsequent measurement with the pipe 12. The calibration running time or empty space running time determined in this way can subsequently be compared with the running time shown in FIG. 2 with the tube 12 recorded, where in particular the difference between the times tP1 and tP0 is included as the total delay of the total reflection peak at the reflection device 36. Thus, both the wall thickness wd and the refractive index n14 can be determined from the two measurements.

Alternatively, the first measurement is again a radar measurement or THz measurement through the tube 12, which thus provides the transit time Delta_t through the wall 30. Furthermore, as a second measurement, a direct mechanical measurement of the layer thickness wd is performed by a mechanical measuring device 35, which can be performed, for example, on a cut-to-length pipe section 22, so that wd and n14 can again be determined from the above system of equations GL1. In this embodiment form, the radar measurement can be carried out via the stationary radar measuring device 26 or a portable radar measuring device 34 with preferably the same radar measuring chip, in particular an FMCW sensor, which is also used in the stationary radar measuring device 26.

Thus, in the method according to the present disclosure as shown in FIG. 3, the wall thickness wd and the refractive index n14 are determined in step St4.

According to step St5, the additive content K8 is subsequently determined from the refractive index n14, which is determined in step St4. For this purpose, according to FIG. 4 stored measured values m are used, which have preferably been determined from previous measurements with the same radar radiation. FIG. 4 shows a measurement curve of the dependence of the refractive index n14 of a polyethylene plastic to which carbon black has been added as a function of the additive content K8. A number of measuring points are plotted here, from which it is subsequently possible to interpolate or extrapolate. In particular, an affine linear dependence is shown here.

Thus, the initial additive content K8 is known, which is thus compared in step St6 with a target additive content K8_target, whereupon, in step St7, the additive content K8 is changed or controlled by automated or manual control of the metering device 6 and change of the additive feed rate K8.

Then, in step St8, the current layer time Delta_t is measured continuously or repeatedly during the extrusion with the stationary radar measuring device 26 or the portable radar measuring device 34. Thus, step St8 corresponds to the measurement in step St4, although different radar measuring devices 26, 34 can also be used in steps St4 and St8. For example, the first measurement in step St4 can be performed by the portable radar measurement device 34 and the subsequent measurements in step St8 by the stationary radar measurement device 26, or vice versa if necessary.

Thus, in step St5 to St8, a fast and precise control of the additive content K8 is realized.

If, for example, a target additive content K8 of 1.5 percent additive is to be achieved and a current carbon black content K8 of 2.5 percent is measured, the metering device 6 is controlled in such a way that the mass throughput set for it is reduced, for example, in proportion to these values. Preferably, the measurement and control of the additive feed takes into account the time delay caused by the transit time of the material from the metering device 4 and the extruder 2 to the measuring point of the stationary radar measuring device 26.

A further external control loop is then preferably used to set the wall thickness wd, with the control device 10 here controlling the extruder 2 and the haul-off (pull-off) 18. For this purpose, the wall thicknesses wd on cut-to-length pipe sections 22 can be measured mechanically at larger intervals, for example.

In extrusion lines, a free-flowing bulk material or dump material, for example as granules, flakes, powder, or pellets, may be melted and output as an extrusion product, for example a profile or also a film or a sheet. In this case, additives are often added to the starting materials as further bulk material, so that the several bulk materials are then melted and extruded together in the extruder. In particular, carbon black, which serves to protect against UV radiation, can be added as an additive, as can calcium carbonate or barium sulfate for PVC or polypropylene (PP) plastic materials, for example, which are used as sound insulation in pipes or as a favourable additive, i.e. favourable filler.

EP3156140A1 describes a metering device for free-flowing bulk material that can subsequently be fed to an extruder. DE 10 2015 110 600 B3 describes an extrusion line in which a wall thickness is determined by THz radiation or radar radiation by means of time-of-flight measurement. The layer travelling time of the radar radiation determined in this way generally initially provides only the mathematical product of layer thickness and refractive index.

Precise adjustment of the additive content is generally important. For example, too a high carbon black content can cause the material of the extrusive product to become brittle. For this purpose, the carbon black content is generally determined by an ash test of the extrusion product; however, such tests are time-consuming and can only be taken into account with a significant time delay when feeding the components. In the case of calcium carbonate and barium sulfate, the additives or fillers influence the desired sound and mechanical properties of the end product.

Thus, it is an object of the present disclosure to provide a method for extruding and an extrusion line which enable a precise determination of an additive content, with relatively little effort.

This object is realized by a method according to claim 1. The subclaims describe preferred embodiments. The method is in particular executable in the extrusion line.

Thus, continuous monitoring of the additive content is provided by a stationary radar measuring device, i. e. an inline radar measuring device provided in the extrusion line, which continuously measures the conveyed extrusion product and outputs a transit time measuring signal of a layer of the extrusion product. The travel time thus determined depends initially on the geometric layer thickness and the refractive index, i.e. the speed of light in the material of the extrusion product.

Thus, some advantages can be achieved. For example, in-line measurement of the additive content, i.e. during extrusion in the extrusion line, is possible. In contrast to other determinations such as the ash test, a control can thus be carried out in which the additive feed rate is adjusted accordingly. Here, the additional effort is low, since stored reference measured values are used, According to the present disclosure, the dependence of the refractive index of the extrusion product on the additive content is preferably determined or calibrated in reference measurements carried out in advance. In particular, the sufficiently low concentration values of typical additives such as carbon black or calcium carbonate show an affine linear dependence, i.e. the refractive index subsequently increases from an initial refractive index of the pure plastic material along a straight line or at least substantially along a straight line when the additive is fed in, whereby this dependence can be determined and stored by calibration measurements or reference measurements.

When the additive is thus fed to the extruder, advantageously in pure form, for example as carbon black pellets, it is possible in principle to control the additive content by continuously measuring the additive content and controlling the metering device for the additive bulk material on this basis.

For this purpose, a measurement of both the layer thickness and the refractive index of the extrusion product is initially carried out. For this purpose, two measurements are advantageously carried out, since a radar transit time measurement can only determine the product of the refractive index and layer thickness. For the two measurements, a radar measurement, for example by the stationary measuring device or also a portable radar measuring device, and furthermore a mechanical layer thickness measurement can be carried out. Alternatively, the layer thickness and refractive index can also be determined by a calibration measurement of the inline radar measuring device with an empty measuring chamber and subsequent measurement of the extruded product, since these two measurements can also be used to determine both the layer thickness and the refractive index.

Based on the stored reference data, the control of the metering device for the additive can be changed accordingly. The control of the carbon black content is preferably provided as near-loop control or near-loop control. For the superimposed layer thickness control, the haul-off and/or the extruder and/or the feeding device for the first bulk material can be controlled subsequently.

The measurement is carried out in particular after cooling of the extrusion product, since radar or THz time-of-flight measurements are dependent on the temperature and, in particular, the crystallinity of the extrusion product, whereby the refractive index, and also the density of the material and possibly the shape of the layer can change during cooling.

The feeding device for the first bulk material is advantageously a gravimetric feeding device, i.e. a gravimetric scale or weighing machine, which measures the added bulk material in a continuous process, whereby it further enables the adjustment of the feeding rate. The metering device for the additive bulk material is advantageously also a gravimetric metering device, which enables continuous measurement of the added additive, and furthermore metering or changing of the feed rate.

The extrusion product to be measured can be a strand, for example a pipe or cylindrical pipe or a rectangular tube, but also a sheet or film.

The radar radiation or THz radiation used is preferably in the frequency range from 10 GHz to 50 THz, in particular from 30 or 50 GHz to 10 THz or 30 THz, preferably as frequency modulation, in particular frequency modulated continuous radar (FMCR), and/or as direct time-of-flight measurement and/or as pulsed radiation. The radar radiation can thus also be in the microwave range.

In the extrusion step of melting, a melt is generated from the supplied bulk materials. Here, at least the first bulk material is melted, whereby the additive bulk material itself, e.g. carbon black or a salt such as barium sulfate or calcium carbonate, may not be melted but is included in the melt.

The invention claimed is:

1. A method for extruding an extrusion product, comprising at least the following steps:
   feeding a first bulk material via a feeding device with a first feeding rate to an extruder,
   feeding an additive bulk material via a metering device with an additive feed rate to the extruder,
   melting at least the first bulk material and extruding an extrusion product,
   cooling the extrusion product,
   measuring the extrusion product while determining a layer thickness and a refractive index, wherein a layer transit time of the extrusion product is measured with a radar measuring device,
   determining an additive content of the extrusion product from the refractive index and calibration values,
   comparing the determined additive content with a target additive content and controlling the additive content by controlling the metering device and changing the additive feed rate,
   subsequently, during extrusion, continuous or repeated measurements of the current layer running time with the radar measuring device or a further radar measuring device and determination of the current refractive index, and subsequent adjustment or control of the additive content by feedback to the determination of the additive content of the extrusion product,
   wherein the control of the additive content is carried out as a closed loop control and a control of the layer thickness is an external control loop superimposed over the control of the additive content as a superordinate control.

2. The method of claim 1, wherein the first bulk material is a plastic material or rubber material and the additive bulk material is carbon black, barium sulfate or calcium carbonate, and wherein the first bulk material is supplied as the additive bulk material is supplied.

3. The method claim 1, wherein during the initial measurement of the extrusion product the layer thickness and an initial refractive index are determined with two measurements:
   a radar time-of-flight measurement as calibration measurement of a stationary radar measuring device before extrusion with empty measuring chamber, and a subsequent radar time-of-flight measurement of the extrusion product with unchanged stationary radar measuring device and/or
   a radar transit time measurement, by means of the stationary or portable radar measuring device, and a mechanical measurement of the layer thickness of the extrusion product.

4. The method of claim 1, wherein the radar measurement is carried out by means of a stationary radar measuring device and/or a portable radar measuring device, and radar radiation or THz radiation in the following frequency range is used: 10 GHz to 50 THz.

5. The method of claim 1, wherein a strand is extruded as the extrusion product and subsequently cut to length, wherein a wall thickness of a wall region of the profile being determined as the layer thickness, and wherein the strand is a tube or a rectangular profile.

6. The method of claim 1, wherein the reference measured values have measurements of the refractive index as a function of the additive contents, and an actual additive content being determined from the reference measured values.

7. The method of claim 1, wherein the feeding device for the first bulk material and/or the metering device for the additive is a gravimetric measuring device for measuring a mass throughput per time.

8. The method of claim 1, wherein an automated or manual control of the metering device is provided.

9. The method of claim 1, wherein the measurement and control of the additive feed takes into account a time delay caused by the transit time of the material from the metering device for the additive bulk material to the measuring point of the stationary radar measuring device.

10. The method of claim 1, wherein in the superimposed external control loop of the layer thickness, an adjustment of a haul-off and/or of the extruder and/or of a feed device for the first bulk material takes place, and in the closed loop control of the additive content, these values remain unchanged and only a metering device for the additive bulk material is controlled.

11. The method of claim 10, wherein the superimposed external control of the layer thickness, a mechanical measurement of the layer thicknesses takes place at time intervals which are greater than time intervals of the current measurements of the layer running time with the stationary radar measuring device.

* * * * *